US011688543B2

(12) United States Patent
Brockschmidt, Jr. et al.

(10) Patent No.: US 11,688,543 B2
(45) Date of Patent: Jun. 27, 2023

(54) METHOD OF CREATING POWER CONTROL MODULE

(71) Applicant: The Boeing Company, Chicago, IL (US)

(72) Inventors: Arthur Edward Brockschmidt, Jr., Renton, WA (US); Shailesh Atreya, Missian Viejo, CA (US); Justin M. Rapozo, Federal Way, WA (US); Kenneth P. Kollias, West Chester, PA (US); Tina Stoia, Rancho Santa, CA (US)

(73) Assignee: THE BOEING COMPANY, Chicago, IL (US)

( * ) Notice: Subject to any disclaimer, the term of this patent is extended or adjusted under 35 U.S.C. 154(b) by 520 days.

(21) Appl. No.: 16/786,145

(22) Filed: Feb. 10, 2020

(65) Prior Publication Data
US 2021/0249174 A1    Aug. 12, 2021

(51) Int. Cl.
*H02M 3/335* (2006.01)
*H01F 41/061* (2016.01)
*H01F 41/12* (2006.01)
*B64C 39/02* (2023.01)
*H01F 41/02* (2006.01)
(Continued)

(52) U.S. Cl.
CPC ........... *H01F 27/24* (2013.01); *B64C 39/024* (2013.01); *H01F 27/28* (2013.01); *H01F 27/327* (2013.01); *H01F 27/40* (2013.01); *H01F 41/0206* (2013.01); *H01F 41/061* (2016.01);
(Continued)

(58) Field of Classification Search
CPC ............ B64C 39/024; B64C 2201/027; B64C 2201/042; H01F 41/0206; H01F 41/061; H01F 41/127; H02M 3/33569
See application file for complete search history.

(56) References Cited

U.S. PATENT DOCUMENTS 3,080,505 A * 3/1963 Eppert ............... H05B 41/2325
315/282
6,668,444 B2 * 12/2003 Ngo ..................... H01F 41/0226
336/212
(Continued)

FOREIGN PATENT DOCUMENTS

CN    206673838 U  * 11/2017  ......... H01F 27/2847

OTHER PUBLICATIONS

Austrin 2006 Inter Congress Aeronautical Sciences, 2006 (Year: 2006).*

Primary Examiner — Peter Dungba Vo
Assistant Examiner — Jose K Abraham
(74) Attorney, Agent, or Firm — Sage Patent Group

(57) ABSTRACT

A power control module and a method to create the power control module is provided. The power control module includes a plurality of transformers, wherein each transformer of the plurality of transformers includes a stack of ferrite cores comprising a plurality of ferrite cores and a continuous winding. The continuous winding has a plurality of turns through each ferrite core of the plurality of ferrite cores. The plurality of ferrite cores are oriented such that the plurality of ferrite cores are stacked together with legs of the plurality of ferrite cores oriented in opposite directions, and wherein the continuous winding comprises a folded section that extends between the plurality of ferrite cores of the stack of ferrite.

9 Claims, 16 Drawing Sheets

(51) Int. Cl.
  *B64U 50/19* (2023.01)
  *H01F 27/24* (2006.01)
  *H01F 27/28* (2006.01)
  *H01F 27/40* (2006.01)
  *H01F 27/32* (2006.01)
  *B64U 10/13* (2023.01)

(52) U.S. Cl.
  CPC ...... *H01F 41/127* (2013.01); *H02M 3/33569* (2013.01); *B64U 10/13* (2023.01); *B64U 50/19* (2023.01)

(56) References Cited

U.S. PATENT DOCUMENTS

| | | | | |
|---|---|---|---|---|
| 2005/0047175 A1* | 3/2005 | Kawasaki | ......... | H02M 3/33592 363/16 |
| 2007/0229206 A1* | 10/2007 | Kit | ............... | H01F 27/2847 336/200 |
| 2008/0101097 A1* | 5/2008 | Kawasaki | ............... | H01F 30/06 336/200 |
| 2008/0212341 A1* | 9/2008 | Moiseev | .................. | H01F 3/14 363/21.04 |
| 2009/0168461 A1* | 7/2009 | Nakahori | ............ | H02M 3/3378 363/17 |
| 2010/0246214 A1* | 9/2010 | Nakahori | ............... | H02M 1/34 363/17 |
| 2010/0321960 A1* | 12/2010 | Nakahori | ............ | H01F 27/2847 363/21.04 |
| 2013/0118002 A1* | 5/2013 | Burke | .................... | H01F 41/06 29/605 |
| 2016/0181008 A1* | 6/2016 | de Groot | ............... | H02M 1/44 363/127 |
| 2017/0085183 A1* | 3/2017 | Notsch | .................... | H02M 1/44 |
| 2018/0076627 A1* | 3/2018 | Thompson | ............. | H02J 3/381 |
| 2019/0047704 A1* | 2/2019 | Liu | ........................ | B64D 27/02 |
| 2019/0221362 A1* | 7/2019 | Jitaru | .................. | H01F 27/2804 |
| 2020/0219643 A1* | 7/2020 | Li | ........................... | H01F 27/28 |
| 2020/0251271 A1* | 8/2020 | Jacobson | ................ | H01F 27/28 |

* cited by examiner

METHOD OF CREATING POWER CONTROL MODULE

The present disclosure relates generally to power control modules, and more particularly to power transformers of power control modules.

BACKGROUND

Power control modules for areas such as automobiles, aircraft, etc. that traditionally rely on commercially available components that have size, weight and power issues.

For example, in unmanned aerial vehicles (UAV), the size and weight of the various control components can affect battery life and the size of the battery. One of the control components that affects battery life and size of the battery is the power transformer used to transform the battery voltage to required control voltages and/or motor drive voltages required for UAV operation.

The size and weight of power transformers generally follow a set of constraints that should be observed in the transformer design. For example, output power, Po (operating voltage multiplied by maximum current demand) that the secondary winding should be capable of delivering to the load within specified regulation limits, maximum power loss that can be allowed in the transformer, maximum permissible temperature rise for the transformer when it is used in a specified temperature environment, and the like all effect the size and weight of a power transformer.

Conventionally designed transformers generally use wire that is sized to handle loads that are above required loads to reduce temperature rises during operation. The wires used typically have a significant amount of insulation. Additionally, the ferrite cores used have to be large enough for the wires to be wrapped around the ferrite cores. This can lead to a weight of the transformers and transformers that may be too big for the space allocated for the transformers.

There is, therefore, a desire for a power control module that reduces weight and size compared to conventional power control modules.

SUMMARY

A power control module is provided. The power control module includes a plurality of transformers. Each transformer of the plurality of transformers includes a stack of ferrite cores comprising a plurality of ferrite cores and a continuous winding having a plurality of turns through each ferrite core of the plurality of ferrite cores, the plurality of ferrite cores being oriented such that the plurality of ferrite cores are stacked together with legs of the plurality of ferrite cores oriented in opposite directions, and wherein the continuous winding comprises a folded section that extends between the plurality of ferrite cores of the stack of ferrite.

In an embodiment, the power control module further includes a secondary winding, the secondary winding extending through each of the plurality of ferrite cores of the plurality of transformers, wherein the secondary winding comprises, for each stack of ferrite cores, respective folded sections that extend between the plurality of ferrite cores of the stack of ferrite cores. The power control module further includes a plurality of output diodes connected to the secondary winding.

In a further embodiment, the ferrite cores are stacked such that legs of a first ferrite core of the stack that is wound with the secondary winding and the continuous primary winding is stacked on legs of the second ferrite core of the stack and oriented such that the first ferrite core and the second ferrite core are stacked together with legs of the first ferrite core and the second ferrite core oriented in opposite directions and the secondary winding and the primary continuous winding are folded along an axis.

In some embodiments, for each transformer of the plurality of transformers, a set of field effect transistors (FETs), wherein FETs of the set of FETS are positioned on opposite sides of the stack of ferrite cores, and wherein the continuous winding comprises two leads that interface with the FETs positioned on opposite sides of the stack of ferrite cores.

In yet another embodiment, the continuous winding is wound such that each of the plurality of turns is wound through a first slot of the first ferrite core and a first slot of the second ferrite core of the stack and back through the second slot of the first ferrite core and the second slot of the second ferrite core of the first stack.

In a further embodiment, the plurality of transformers is separated by a distance selected based on at least one of location constraints, cooling methods, or connections.

In yet a further embodiment, the plurality of transformers are sized to handle a first power draw for a first time period followed by a second power draw for a second time period, wherein the first power draw is a power draw of approximately sixty kilowatts (kWs) for a first time period of approximately thirty seconds and the second power draw is a power draw of approximately one hundred twenty kWs for a second time period of approximately ten seconds.

In accordance with another aspect, a method to create a power control module is provided. The method includes winding a first continuous primary winding having a plurality of turns through each of a first ferrite core and a second ferrite core of a first stack of the plurality of stacks of ferrite cores. The method further includes winding a second continuous primary winding having a plurality of turns through each of a first ferrite core and a second ferrite core of a second stack of the plurality of stacks of ferrite cores. The method further includes winding a secondary winding with at least one turn through each ferrite core of the plurality of stacks of ferrite cores to connect the plurality of stacks of ferrite cores. The method further includes forming a plurality of transformers connected to each other via the secondary winding at a distance apart from each other with each transformer of the plurality of transformers having a folded section that extends between the plurality of ferrite cores of the stack of ferrite cores.

In some embodiments, the method includes placing each stack of the plurality of stacks of ferrite cores on a surface with each of the first ferrite core and the second ferrite core of the stack placed on the surface at a distance between the first ferrite core and the second ferrite core, wherein each transformer of the plurality of transformers is formed by folding one of the first ferrite core and the second ferrite core on the other of the first ferrite core and the second ferrite core to form stack the plurality of stacks of ferrite cores.

In one embodiment, for each stack of the plurality of stacks, each of the first ferrite core and the second ferrite core have a first slot and a second slot, and winding the first continuous primary winding includes winding the first continuous primary winding such that each of the plurality of turns of the first continuous primary winding is wound through the first slot of the first ferrite core and the second ferrite core of the first stack and back through the second slot of the first ferrite core and the second ferrite core of the first stack, and winding the second continuous primary winding comprises winding the second continuous primary winding such that each of the plurality of turns of the second continuous primary winding is wound through the first slot of the first ferrite core and the second ferrite core of the second stack and back through the second slot of the first ferrite core and the second ferrite core of the second stack.

In a further embodiment, winding the secondary winding includes winding the secondary winding by winding a single turn wound through each first slot of the first stack across the distance and each first slot of the second stack and back through the second slot of the second stack, across the distance, and through each second slot of the first stack.

In yet another embodiment, forming the plurality of transformers connected to each other via the secondary winding includes folding one of the first ferrite core and the second ferrite core on the other of the first ferrite core and the second ferrite core to form a stack of ferrite cores with each stack oriented such that legs of the first ferrite core and the second ferrite core are stacked together and oriented in opposite directions and the secondary winding and the first continuous primary winding or the second continuous primary winding are folded along an axis.

In any of the above embodiments, the method includes connecting a plurality of output diodes to the secondary winding.

In any of the above embodiments, the method includes for each transformer of the plurality of transformers, connecting a set of field effect transistors (FETs), wherein FETs of the set of FETS are positioned on opposite sides of the stack, by interfacing leads of the first primary continuous winding or the second primary continuous winding with the FETs positioned on opposite sides of the stack, wherein the leads of the first continuous primary winding or the second continuous primary winding comprises two leads.

In one embodiment, winding the first continuous primary winding comprises winding a first copper sheet and winding the second continuous primary winding comprises winding a second copper sheet. Each of the first copper sheet and the second copper sheet comprises a plurality of layers, each layer of the plurality of layers separated by a non-conductive material and winding the first copper sheet includes winding four turns of the first copper sheet and winding the second continuous primary winding comprises winding four turns of the second copper sheet.

In any of the above embodiments, the method includes potting the plurality of transformers with thermal conductive potting to form a plurality of potted transformers.

In any of the above embodiments, the plurality of transformers is placed in a multi-rotor unmanned aerial vehicle.

In any of the above embodiments, the method includes sizing the plurality of transformers to handle a first power draw for a first time period followed by a second power draw for a second time period.

In one embodiment, sizing the plurality of transformers includes sizing the plurality of transformers to handle a first power draw of approximately sixty kilowatts (kWs) for a first time period of approximately thirty seconds and a second power draw of approximately one hundred twenty kWs for a second time period of approximately ten seconds

BRIEF DESCRIPTION OF THE DRAWINGS

The accompanying drawings, which are included to provide a further understanding of the disclosure and are incorporated in and constitute a part of this application, illustrate certain non-limiting embodiments of the present disclosure. In the drawings.

DETAILED DESCRIPTION

Inventive concepts will now be described more fully hereinafter with reference to the accompanying drawings, in which examples of embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
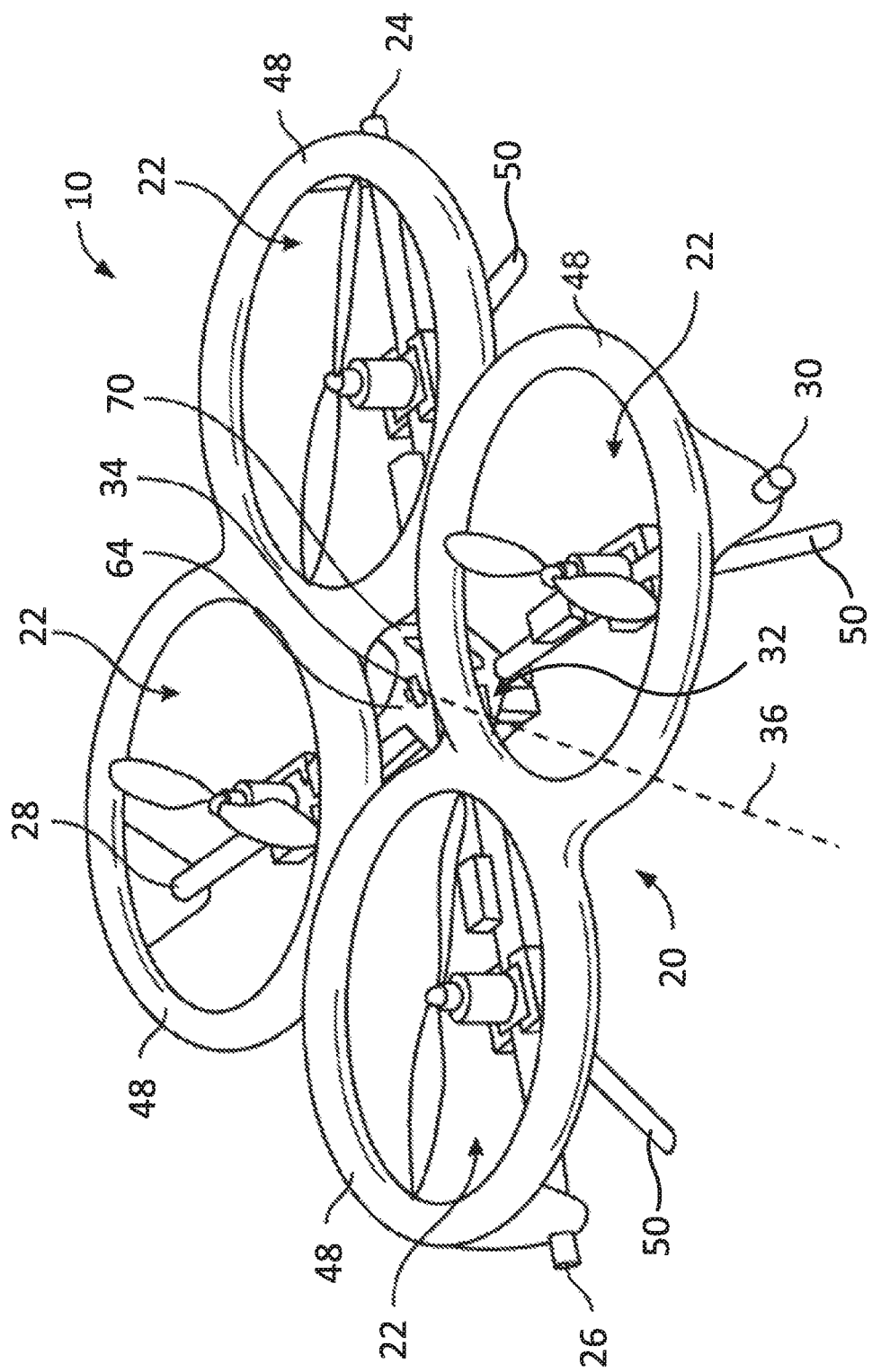
FIG. 1 is a block diagram illustrating an operating environment according to example embodiments of the present disclosure.

FIG. 1 is a block diagram illustrating an exemplary operating environment of where the power control module may be used. It should be understood that other operating environments may be used.

Described herein is a power control module for an aerospace vehicle such as an unmanned aerial vehicle (UAV). Although, various embodiments are described herein with respect to a multi-rotor UAV wherein the rotors are implemented as fixed rotors it should be realized the various embodiments described herein may be utilized with any aerial platform. In this regard, an aerial platform may include an aerial vehicle which may further include a manned vehicle or unmanned vehicle. As used herein, fixed rotors means that the pitch of the rotor blades may not be changed to alter the trajectory or flight path of the UAV. It should be realized that the methods and systems described herein may also be utilized to provide a power control module for a manned or piloted vehicle, such as for example, a helicopter or any other commercial or general aviation aircraft.

FIG. 1 is a view of a UAV 10. The UAV 10 includes an airframe 20 and a plurality of propulsion systems 22 coupled to the airframe 20. In general, the airframe 20 forms the structural body or framework for the UAV 10. Moreover, the airframe 20 may be utilized to mount various components, such as for example, a plurality of individual UAV propulsion systems 22. In the illustrated embodiment shown in FIG. 1, the UAV 10 includes four propulsion systems 22, wherein each propulsion system 22 is mounted to a respective arm 24, 26, 28, and 30. Thus, in the illustrated embodiment, the UAV 10 includes four arms 24, 26, 28, and 30 and a single propulsion system 22 that is mounted to each respective arm 24-30.

In one embodiment, the airframe 20 includes a hub 32 that is configured to receive the plurality of arms 24-30 therein. In the illustrated embodiment, the hub 32 is formed as a single unitary component that includes a plurality of openings (not shown) defined therein. During assembly of the airframe 20, a single arm is inserted into a respective opening. In operation, a center point 34 of the hub 32 is located at the center of gravity 36 for the UAV 10.

Figure 2:
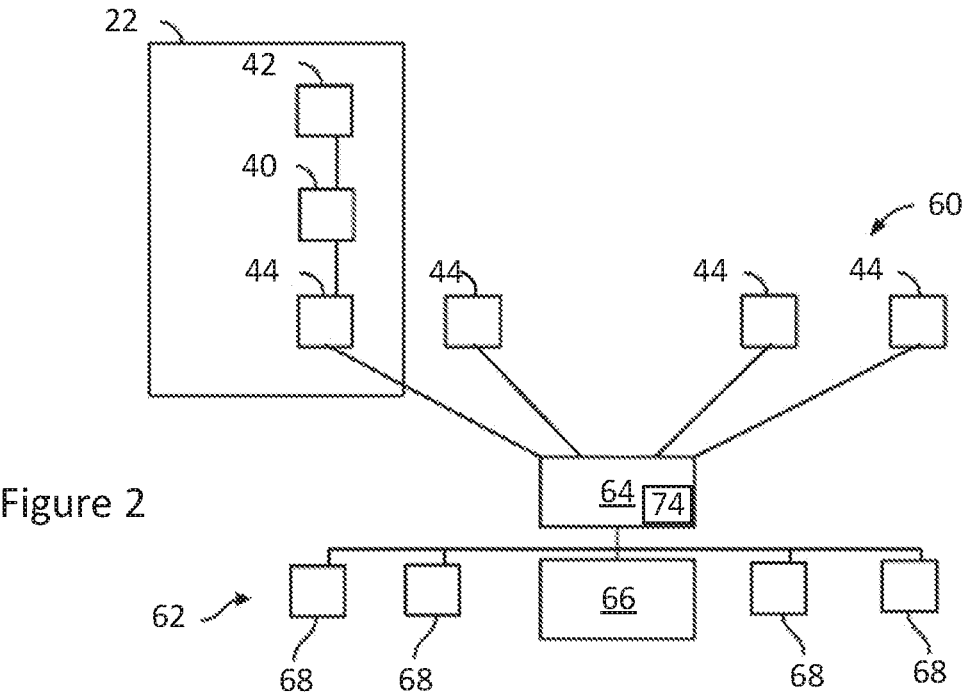
FIG. 2 is a block diagram illustrating aspects of the operating environment of FIG. 1 according to example embodiments of the present disclosure.

Each of the arms 26, 28, and 30 shown in FIG. 1 also includes a single propulsion system 22 that can be substantially the same. Turning to FIG. 2, in one embodiment, the propulsion system 22 includes a motor 40 that is configured to drive a rotor 42. The propulsion system 22 also includes a motor controller 44, that is also referred to herein as an electronic speed controller (ESC) that is configured to provide power to the motor 40 and thus control the operational speed of the motor 40. As described above, the rotor 42 is a fixed rotor meaning that the angle, tilt, etc. of the rotor is fixed in a single position. Thus, to maneuver the UAV 10, the operational speeds of the motors 40 are modified, thus modifying the rotational speeds of the rotors 42. In one embodiment, the motor 40 is embodied as a direct current (DC) motor that receives power from the motor controller 44 via a power management system 60, In operation, the motor 40 is directly coupled to the rotor 42 such that the rotor 42 operates at substantially the same rotational speed as the motor 40. More specifically, any changes made to alter the rotational speed of the motor 40 results in a substantially linear rotational speed change of the rotor 42. Thus, the motor controller 44 is utilized to control a rotational speed of each of the rotors 42 individually. Because the illustrated embodiment includes four motor controllers 44, the four motor controllers 44 may operate to control the operational speed of four individual rotors 42 via four individual motors 40. In one embodiment, the motor 40 is embodied as a DC brushless outrunner motor that provides a significant power to weight ratio. However, it should be realized that the motors 40 may be implemented using any type of DC motor or any other types of motors.

Returning to FIG. 1, in various embodiments the UAV 10 also includes a plurality of shrouds 48 wherein a single shroud 48 is disposed around each respective rotor 42. Accordingly, in the illustrated embodiment, the UAV 10 includes four shrouds 48, each surrounding a respective rotor 42. In operation, the shrouds 48 are configured to prevent the rotors 42 from contacting an object in flight. For example, the shrouds 48 prevent the rotors 42 from contacting a building, the ground, another UAV, etc. Additionally, the shrouds 48 facilitate preventing humans from contacting the rotors 42 while in operation. The UAV 10 further includes a landing gear 50 that provides support for the UAV 10 while the UAV 10 is not in flight. The landing gear may be mounted to any part of the airframe 20.

FIG. 2 is a schematic illustration of an exemplary power management system 60. In various embodiments, the power management system 60 includes a power source 62 and a control module 64 that provides power to each of the motor controllers 44. The power source 62 may be implemented as a single battery pack 66, e.g. a single battery or a plurality of individual batteries housed in a single housing, that is installed proximate to the center of gravity 36. In another embodiment, the power source 62 may be implemented as a plurality of batteries 68 wherein at least one battery 68 is installed proximate to a respective propulsion system 22. In a further embodiment, the power source 62 may be implemented using the battery pack 66 and at least one a battery 68 that is installed proximate to a respective propulsion system 22. In operation, the power source 62 provides power to the control module 64 for operating the propulsion systems 22 and various other components mounted on the UAV 10.

In various embodiments, the control module 64 is mounted proximate to the center of gravity 36 of the UAV 10 via a bracket 70. The control module 64 is operable to control the speed of the rotors 42. More specifically, the control module 64 may receive a predetermined flight plan based on a set of flight plan parameters. In response to the flight plan, the control module 64 operates the propulsion systems 22 to move the UAV 10 along the determined flight plan. Optionally, the control module 64 may be configured to receive a manual input from an operator to maneuver the UAV 10 in flight. As discussed above, the control module 64 may also include various other operational components. For example, the control module 64 may include a plurality of accelerometers, anemometers, speed sensors, etc. Thus, in various embodiments the control module 64 is mounted proximate to the center of gravity 36 which is proximate to the center point of the hub 32.

It should be noted that the various embodiments or portions thereof, such as the UAV 10 may be implemented in hardware, software or a combination thereof. The various embodiments and/or components, for example, the control module 64 may be implemented as part of one or more computers or processors. The control module 64 may include a plurality of ports to enable displays, input devices, or other user interfaces to connect to the control module 64. Moreover, the control module 64 may include a radio frequency (RF) receiver/transmitter to enable information, such as a flight plan or modifications to a flight plan, to be transmitted from and/or transmitted to the UAV 10. Thus, the control module 64 may include Random Access Memory (RAM) and Read Only Memory (ROM). The control module 64 may further include a storage device, which may be a hard disk drive or a removable storage drive such as a solid-state drive, optical disk drive, and the like. The storage device may also be other similar means for loading computer programs or other instructions into the control module 64.

Figure 3:
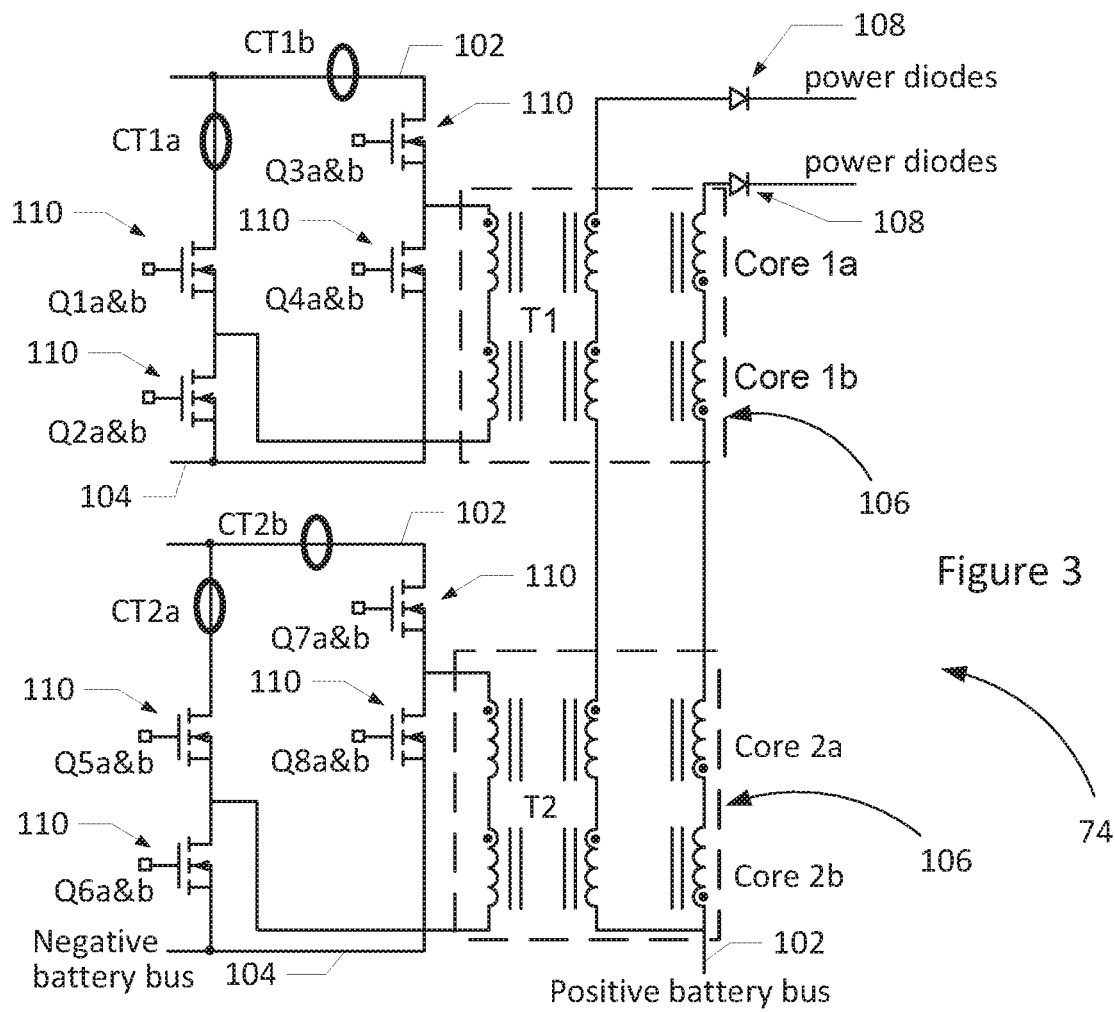
FIG. 3 is a schematic diagram illustrating an electrical configuration of a power control module according to example embodiments of the present disclosure.

One of the components of the control module 64 is a power control module 74. The power control module 74 is sized to provide a first power draw for a first time period and a higher second power draw for a second time period. An electrical schematic of the power control module 74 is illustrated in FIG. 3 for one embodiment of the power control module 74. In FIG. 3, power switches Q1a&b, Q3a&b, Q5a&b, and Q7a&b are connected to a positive battery bus 102 and power switches Q2a&b, Q4a&b, Q6a&b, and Q8a&b are connected to a negative battery bus 104. The voltage differential between the positive battery bus 102 and negative battery bus 104 in one embodiment is 270 Vdc. The switches Q1a&b to Q8a&b are pulse modulated to produce an ac (alternating current) voltage (e.g., a sinusoidal voltage, six-step square wave voltage, etc.) across the primary windings of transformers T1 and T2. The ac voltage across the primary windings produces an ac output voltage at the secondary windings of the transformers T1 and T2. The design and build of the transformers T1 and T2 is often a driver of the size and weight of the power control module 74.

With reference to FIGS. 3 and 5-16, the power control module 74 includes a plurality of transformers 106, wherein each transformer 106 of the plurality of transformers including a stack 500 of ferrite cores comprising a plurality of ferrite cores 502, 504 and a continuous winding 518 having a plurality of turns 506 through each ferrite core of the plurality of ferrite cores, the plurality of ferrite cores being oriented such that the plurality of ferrite cores are stacked together with legs 526 of the plurality of ferrite cores oriented in opposite directions, and wherein the continuous winding 518 comprises a folded section 524 that extends between the plurality of ferrite cores 502, 504 of the stack 500 of ferrite cores.

Figure 6:
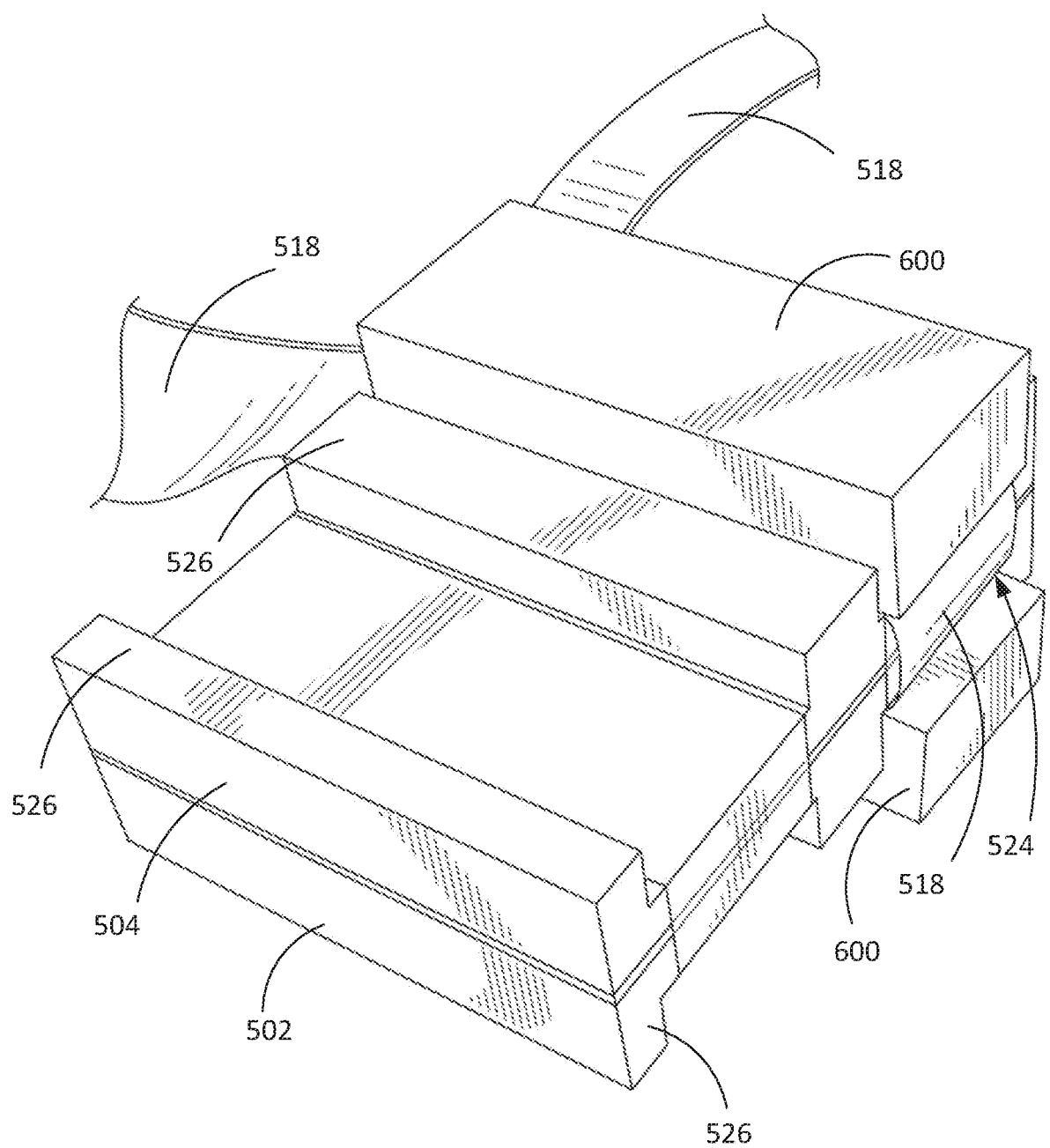
FIGS. 6-16 are illustrations of stages of transformer construction according to example embodiments of the present disclosure.
Figure 12:
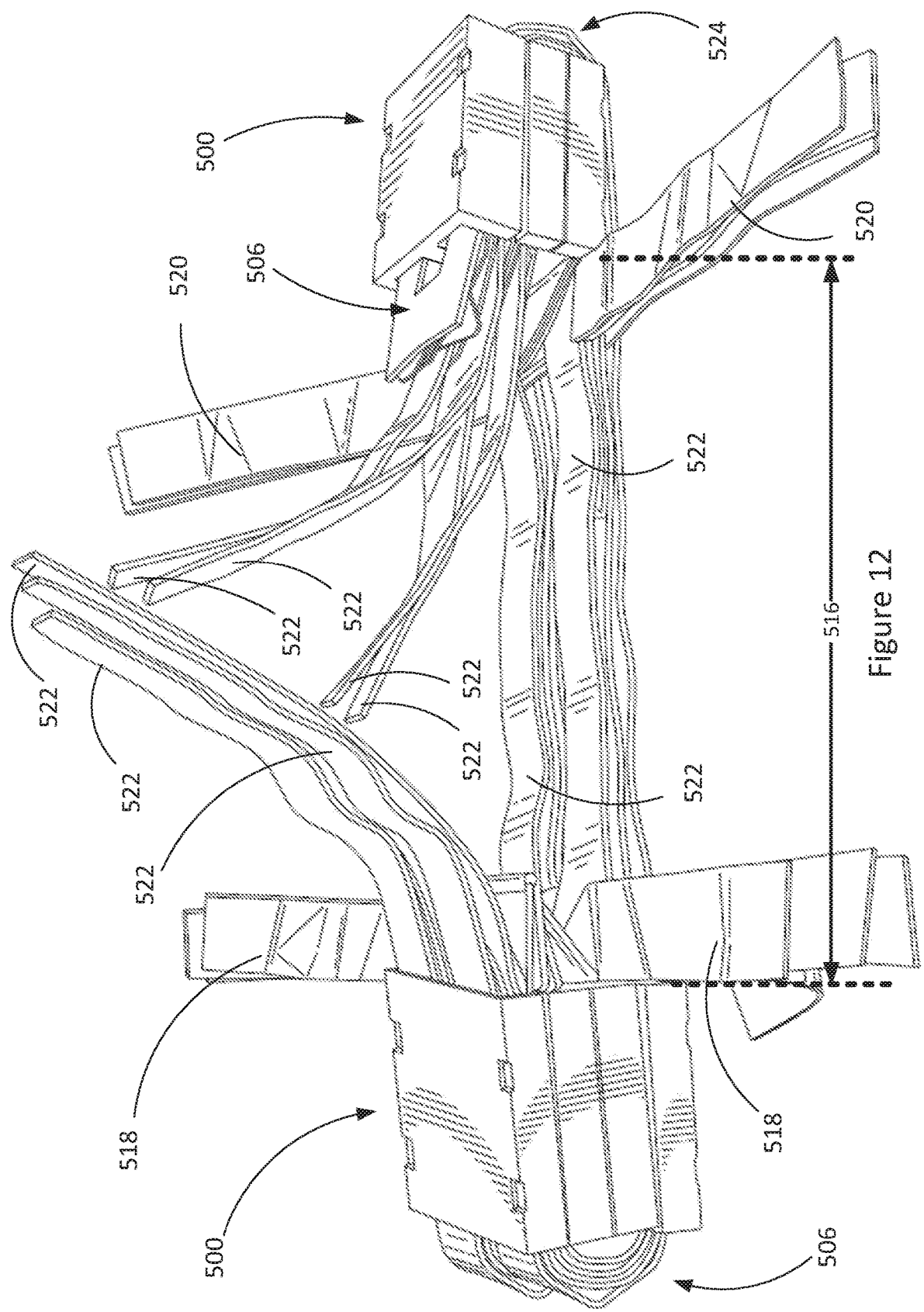
Figure 13:
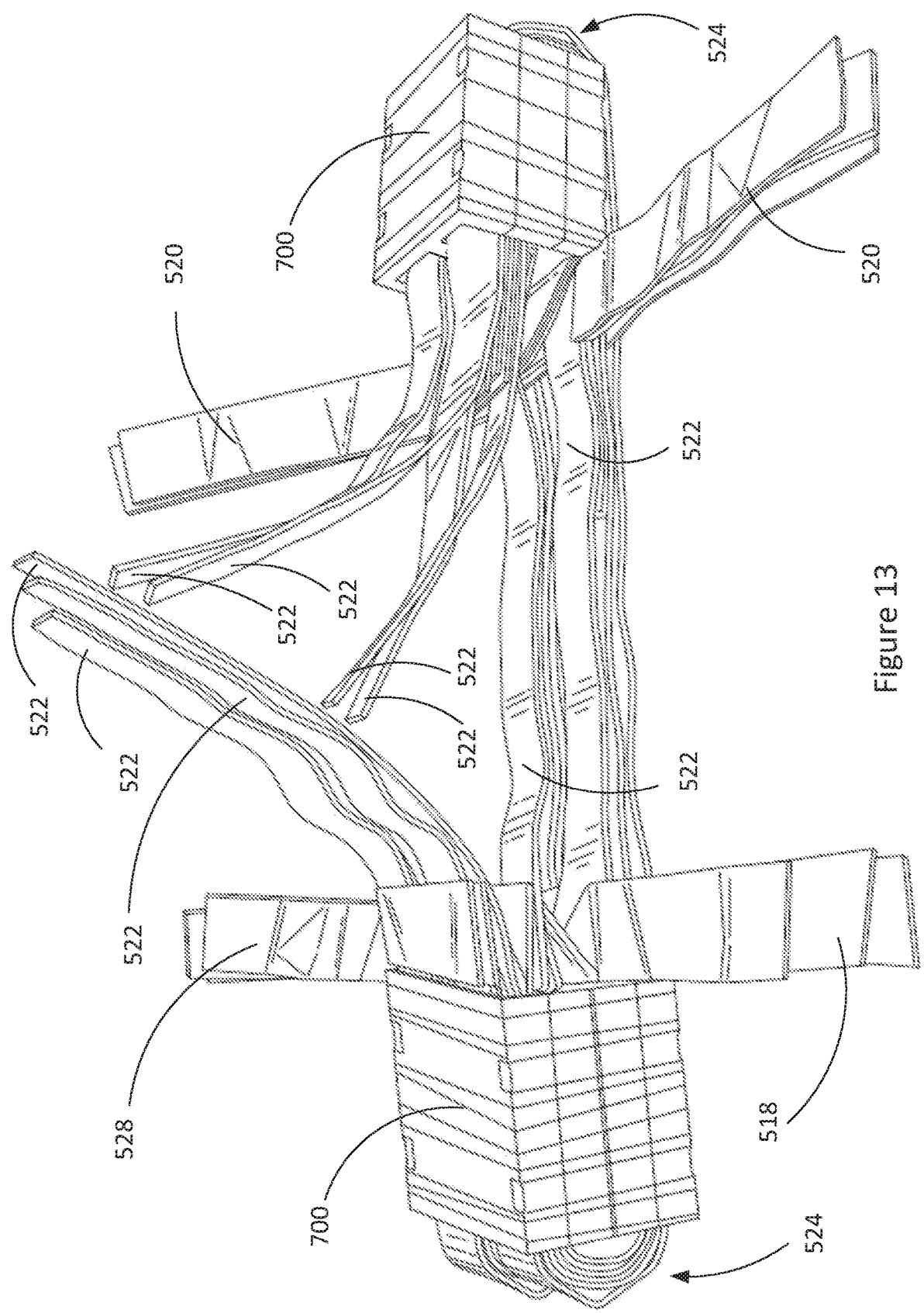

Within examples, the power control module 74 further includes a secondary winding 522, the secondary winding 522 extending between each plurality of ferrite cores of the plurality of transformers, wherein the secondary winding 522 includes, for each stack 500 ferrite cores, respective folded sections 524 that extend between the plurality of ferrite cores 502, 504 of the stack 500 of ferrite cores. The power control module further includes a plurality of output diodes 108 connected to the secondary winding 522. Within examples, the ferrite cores 502, 504 are stacked such that legs 526 of a first ferrite core 502 of the stack 500 of ferrite cores that is wound with the secondary winding 522 and the continuous winding 518 is stacked on the legs 526 of a second ferrite core 504 of the stack 500 of ferrite cores and oriented such that the first ferrite core 502 and the second ferrite core 504 are stacked together with legs 526 of the first ferrite core 502 and the second ferrite core 504 oriented in opposite directions and the secondary winding 522 and the continuous winding 518 are folded along an axis 514. FIG. 6 illustrates the legs 526 of ferrite core 502 and the legs 526 of ferrite core 504 oriented in opposite directions. Further, as can be seen in FIGS. 12-13, the folded section 524 of the continuous winding and of the secondary winding are a bend in the primary winding and the secondary winding, the bend extending between the plurality of ferrite cores of the stack. In an example, the folding occurs when the ferrite core 502 or the ferrite core 504 is moved on top of the other ferrite core 502, 504. As the ferrite core 502 or the ferrite core 504 is moved, the primary winding and secondary winding begin to bend along the axis 514 and form the folded section 524 as the ferrite core 502 or ferrite core 504 move on top of the other ferrite core 502, 504.

Within examples, the power control module 74 further includes, for each transformer of the plurality of transformers, a set of field effect transistors, FETs, 110 wherein FETs 110 of the set of FETs are positioned on opposite sides of the stack 500 of ferrite cores, and wherein the continuous winding 518 includes two leads 528 that interface with the FETs 110 positioned on opposite sides of the stack 500 of ferrite cores. Within examples, the continuous winding 518 is bound such that each of the plurality of turns 506 is wound through a first slot 508 of a first ferrite core 502 of the stack 500 of ferrite cores and a first slot 508 of a second ferrite core 504 of the stack of 500 ferrite cores and back to a second slot 510 of the first ferrite core 502 and a second slot 510 on the second ferrite core 504.

Within examples, the plurality of transformers is separated by a distance 516 selected based on at least one of location constraints, cooling methods, or connections. Within examples, the plurality of transformers is sized to handle the first power draw for a first time period followed by a second power draw for a second time period, or in the first power draw is a power draw of approximately sixty kilowatts, KWs, for a first time period of approximately 30 seconds and the second power draw is a power draw of approximately one hundred twenty kWs for a second time period of approximately ten seconds. The term "approximately" is used to indicate that the terms referred to do not have to be the exact number. For example, approximately sixty kW could mean anywhere from fifty-five kW to sixty-five kW. Similarly, approximately 10 seconds could be nine seconds, ten seconds, or eleven seconds. Thus, in some embodiments, the term "approximately" refers to a value within ten percent of the specified value.

Figure 5:
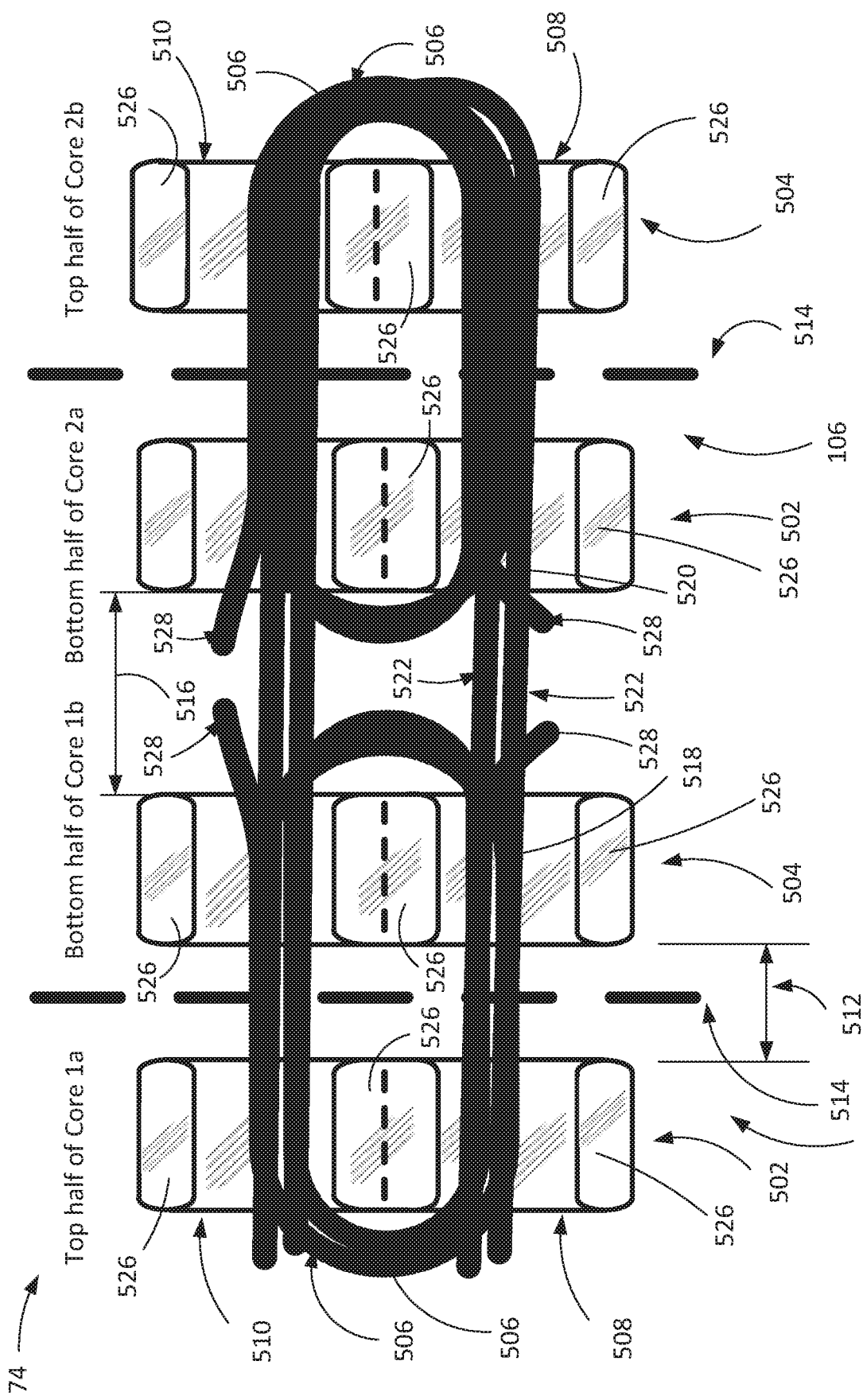
FIG. 5 is an illustration of transformers being wound according to example embodiments of the present disclosure.

Within examples, as shown in FIG. 5, the stack of ferrite cores may be formed by placing each ferrite core 502, 504 of a stack 500 on a surface. Each of the first ferrite core 502 and the second ferrite core 504 of the stack 500 may be placed on the surface at a distance 512 between the first ferrite core 502 and the second ferrite core 504, where each transformer of the plurality of transformer is formed by folding one of the first ferrite core 502 and the second ferrite core 504 on the other of the first ferrite core 502 and the second ferrite core 504 to form the stack 500 of the plurality of stacks of ferrite cores. For instance, in example embodiments, the first ferrite core 502 and second ferrite core 504 are folded at the center line 514 such that the first ferrite core 502 and second ferrite core 504 form the stacks 500 (see FIG. 16) of ferrite cores.

Figures 4A, 4B:
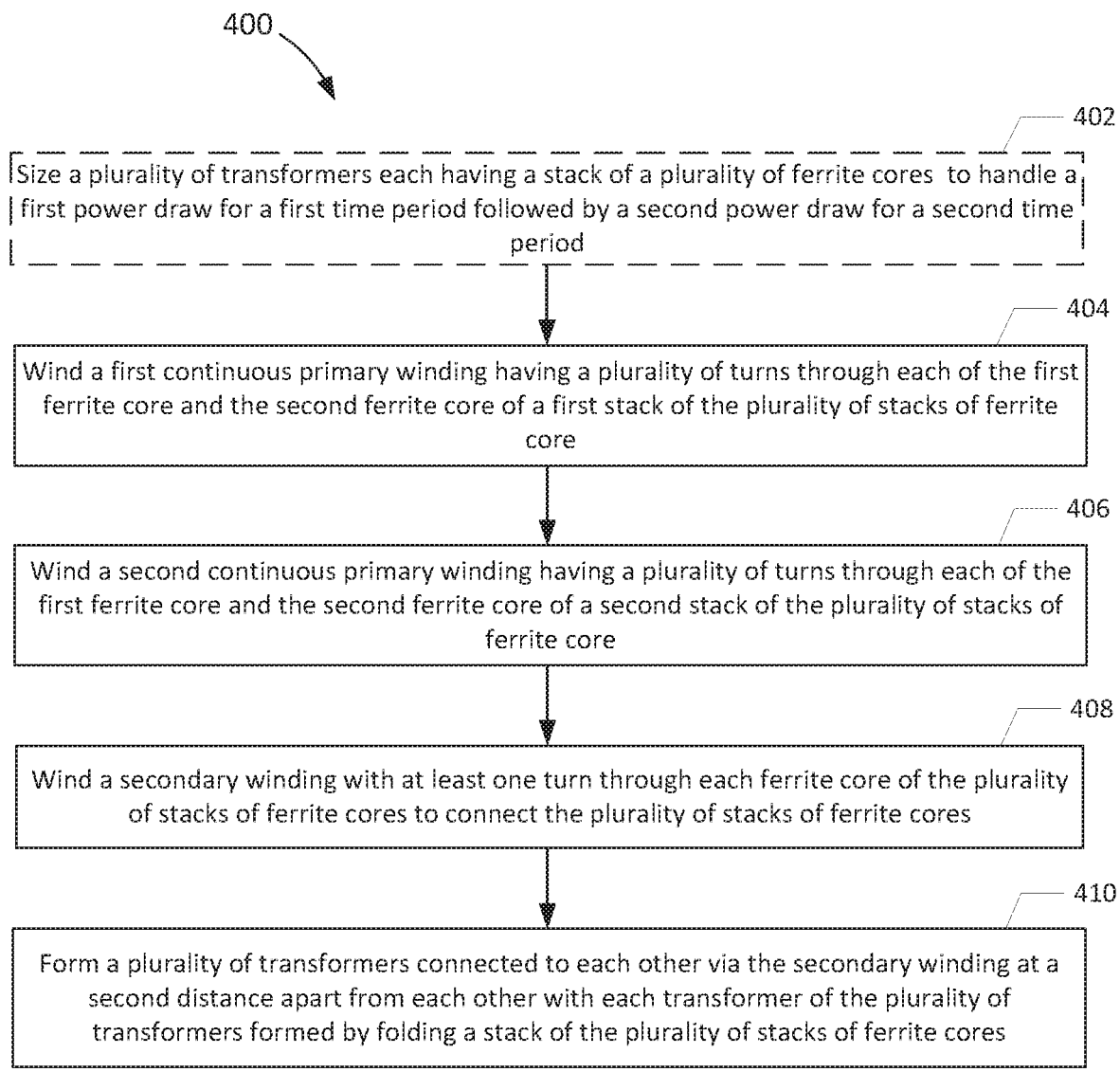
FIGS. 4A-4C are flow charts illustrating operations of constructing a power control module according to example embodiments of the present disclosure.

Turning now to FIGS. 4A-4C and FIGS. 5-16, an embodiment of building the power control module 74 is described. FIG. 4A illustrates a method 400 to create a power control module. In block 402, a plurality of transformers, each transformer having a stack 500 of a plurality of stacks 500 of ferrite cores 502, 504, is sized to handle a first power draw for a first time period followed by a second power draw for a second time period. In one embodiment, the first power draw for the first time period is approximately sixty kW for approximately thirty seconds and the second power draw for the second time period is approximately one hundred twenty kW for approximately ten seconds. The sizing of the transformer is based on an allowed temperature rise for the first power draw and the second power draw.

In block 404, a first continuous primary winding 518 having a plurality of turns is wound through each of the first ferrite core 502 and the second ferrite core 504 of a first stack of the plurality of stacks 500 of ferrite cores. In one embodiment, winding the first continuous primary winding 518 includes winding the first continuous primary winding 518 such that each of the plurality of turns of the first continuous primary winding 518 is wound through the first slot 508 of the first ferrite core 502 and the first slot 508 of the second ferrite core 504 of the first stack 500 and back through the second slot 510 of the first ferrite core 502 and the second slot 510 of the second ferrite core 504 of the first stack 500. The first continuous primary winding 518 may be wound by winding a first copper sheet through the slots 508, 510. The first copper sheet includes a plurality of layers, each layer of the plurality of layers separated by a non-conductive material. The number of turns of the first continuous winding 518 (e.g., the first copper sheet) in one embodiment is four turns of the first continuous winding 518. In other embodiments, the plurality of turns of the first continuous winding 518 may include more or fewer turns. The first continuous primary winding 518 is sized to provide the power required to deliver the first power draw and the second power draw.

In block 406, a second continuous primary winding 520 having a plurality of turns is wound through each of the first ferrite core 502 and the second ferrite core 504 of a second stack 500 of the plurality of stacks 500 of ferrite cores. In one embodiment, winding the second continuous primary winding 520 includes winding the second continuous primary winding 520 such that each of the plurality of turns of the second continuous primary winding 520 is wound through the first slot 508 of the first ferrite core 502 and the second ferrite core 504 of the second stack 500 and back through the second slot 510 of the first ferrite core 502 and the second ferrite core 504 of the second stack 500. The second continuous primary winding 520 may be wound by winding a second copper sheet through the slots 508, 510. The second copper sheet includes a plurality of layers, each layer of the plurality of layers separated by a non-conductive material. The number of turns of the second continuous winding 520 (e.g., the second copper sheet) in one embodiment is four turns of the second continuous winding 520. In other embodiments, the plurality of turns of the second continuous winding 520 may include more or fewer turns. The second continuous winding 520 is sized to provide the power required to deliver the first power draw and the second power draw.

During the winding of the first continuous primary winding 518, a block 600 (see FIG. 6) may be used to hold the first continuous primary winding 518 in place. Similarly, during the winding of the second continuous primary winding 520, block 600 may be used to hold the second continuous primary winding 520 in place.

In block 408, a secondary winding 522 is wound with at least one turn through each ferrite core of the plurality of stacks 500 of ferrite cores to connect the plurality of stacks 500 of ferrite cores. Winding the secondary winding 522 in one embodiment includes winding the secondary winding 522 by winding a single turn wound through each first slot 508 of the first stack 500 across the distance 516 and each first slot 508 of the second stack 500 and back through the second slot 510 of the second stack 500, across the distance 516, and through each second slot 510 of the first stack 500. The secondary winding 522 is sized to provide the power required to deliver the first power draw and the second power draw.

In block 410, a plurality of transformers 106 is formed and are connected to each other via the secondary winding at the distance 516 (see FIGS. 5 and 12) apart from each other with each transformer of the plurality of transformers having a folded section 524 that extends between the plurality of ferrite cores of the stack of ferrite cores. In an example, the plurality of transformers 106 is formed and are connected to each other via the secondary winding at the distance 516 apart from each other with each transformer of the plurality of transformers formed by folding a stack 500 of the plurality of stacks 500 of ferrite cores 502, 504. In an embodiment, forming the plurality of transformers connected to each other via the secondary winding 522 with each transformer of the plurality of transformers formed by folding one of the first ferrite core 502 and the second ferrite core 504 on the other of the first ferrite core 502 and the second ferrite core 504 and oriented such that the first ferrite core 502 and the second ferrite core 504 are stacked together with legs 526 of the first ferrite core 502 and the second ferrite core 504 oriented in opposite directions and wherein the continuous winding 518 includes a folded section 524 that extends between the plurality of ferrite cores 502, 504 of the stack 500 ferrite cores. In some embodiments, the secondary winding 522 and the first continuous primary winding 518 or the second primary continuous winding 520 are folded along an axis 514. In an example, axis 514 is a center line between the ferrite cores 502, 504.

FIG. 4B illustrates a flowchart of an example step that may be included in method 400. As shown in FIG. 4B, the method 400 may include, at bock 412, placing each stack of the plurality of stacks 500 of ferrite cores on a surface with each of a first ferrite core 502 and a second ferrite core 504 of the stack placed on the surface at a distance 512 (see FIG. 5) between the first ferrite core 502 and the second ferrite core 504. This step of block 412 may be performed prior to winding the first continuous primary winding, winding a second continuous primary winding, and winding the secondary winding. In this example, after winding the first continuous primary winding 518, the second continuous primary winding 520, and the secondary winding 522, each transformer of the plurality of transformers is formed by folding one of the first ferrite core and the second ferrite core on the other of the first ferrite core and the second ferrite core to form the stack of the plurality of stacks of ferrite cores. For instance, the first ferrite core 502 and second ferrite core 504 are folded at the axis 514 (see FIG. 5) such that the first ferrite core 502 and second ferrite core 504 form the stacks 500 (see FIG. 16) of ferrite cores. In this example, as the first ferrite core 502 and the second ferrite core 504 are folded at the axis 514, the folded sections 524 of the first continuous winding 518 and of the secondary winding 522 are formed at the same or substantially the same time. Similarly, for the other stack, as the first ferrite core 502 and the second ferrite core 504 are folded at the axis 514, the folded sections 524 of the second continuous winding 520 and of the secondary winding 522 are formed at the same or substantially the same time. In other examples, for each stack, the folded sections 524 of the continuous winding of the stack and of the secondary winding may be formed at different times.

The distance 512 may depend upon sizes of the first ferrite core 502 and the second ferrite core 504, the thickness of the windings (e.g., the thickness of the primary windings and the thickness of the secondary windings), and how the windings are wound. FIG. 5 illustrates a first ferrite core 502 and a second ferrite core 504 at a distance 512. The distance 512 is sized to enable the first ferrite core 502 and second ferrite core 504 to be folded at the center line 514 such that the first ferrite core 502 and second ferrite core 504 form a stack 500 of ferrite cores.

The ferrite stacks 500 are located a distance 516 apart in some embodiments. The distance 516 may depend on location constraints, cooling methods, connections, etc. In an example, the distance 512 between the plurality of transformers is selected based on at least one of location constraints, cooling methods, or connections.

Figure 16:
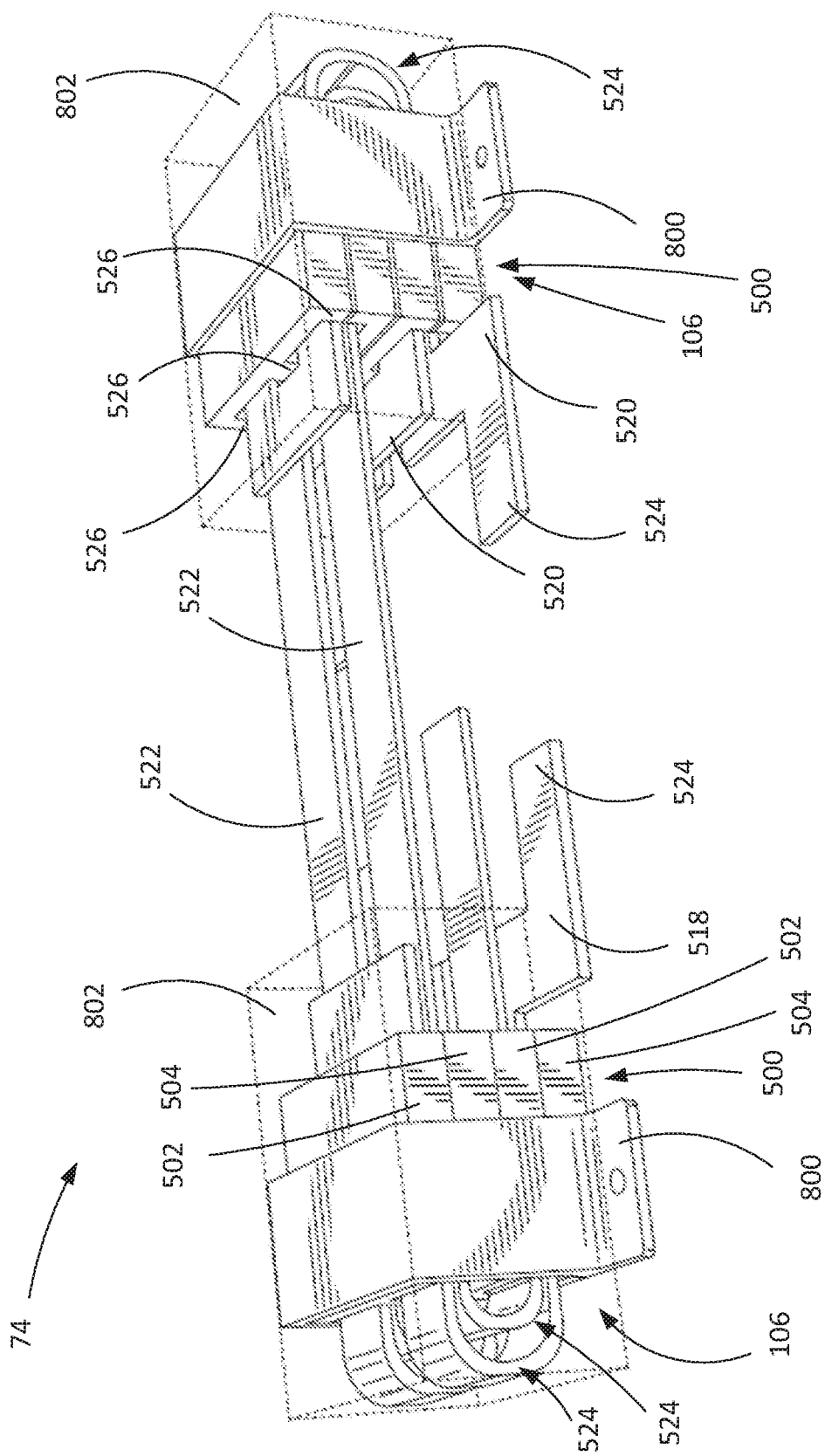

In other embodiments, the plurality of transformers may be formed by placing the cores 502, 504 such that the cores 502, 504 are back to back to each other as illustrated in FIG. 16.

Figure 4C:
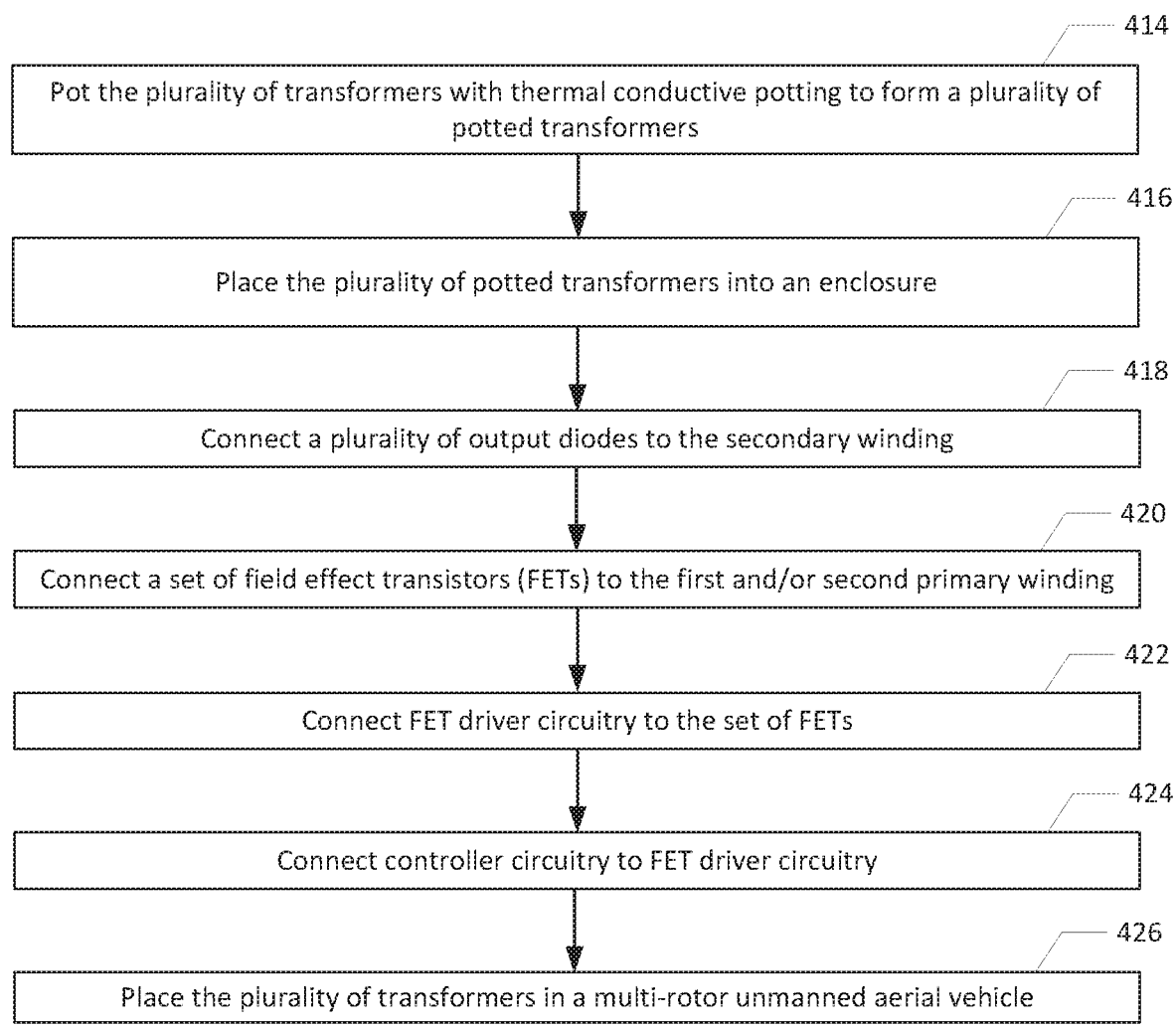

FIG. 4C illustrates a flowchart of example steps that may be included in method 400.

As shown in FIG. 4C, in block 414, the plurality of transformers are potted with a thermally conductive potting 802 to form a plurality of potted windings. The thermal conductive potting helps in cooling the transformer and/or allows more power to flow through the transformer by drawing heat away from the windings and ferrite cores. To hold a stack 500 of the plurality of stacks 500 together before the potting, the stack 500 may be taped together with non-electrically conductive tape 700 (see FIGS. 13-15). The tape 700 may be thermally conductive in some embodiments. The plurality of transformers may be mounted in an enclosure using brackets 800. In other embodiments, the transformers may be potted such that mounting holes are formed in the potting so that the transformer may be mounted with screws via the mounting holes. In other embodiments the mounting holes and the brackets may be used to mount the transformers in an enclosure. In block 416, plurality of potted transformers are placed into an enclosure.

In block 418, a plurality of output diodes 108 are connected to the secondary winding. In block 420, for each transformer of the plurality of transformers, a set of field effect transistors (FETs) 110 is connected, wherein FETs 110 of the set of FETS 110 are positioned on opposite sides of the stack 500, by interfacing leads 528 of the first continuous primary winding 518 or the second continuous primary winding 520 with the FETs 110 positioned on opposite sides of the stack 500, wherein the leads of the first continuous primary winding 518 or the second continuous primary winding 520 consists of two leads 528. In block 422, FET driver circuitry (not shown) is connected to the set of FETs 110. In block 424, controller circuitry (not shown) is connected to the FET driver circuitry.

In block 426, the plurality of transformers 106 is placed in a multi-rotor unmanned aerial vehicle. The multi-rotor unmanned vehicle may be a four rotor unmanned vehicle such as illustrated in FIG. 1 or any other type of unmanned aerial vehicle platform. In one embodiment, the multi-rotor unmanned aerial vehicle is a cargo air vehicle. The power control module 74 can also be used in other air vehicle platforms and other platforms such as autonomous vehicles and other types of vehicles.

Figure 7:
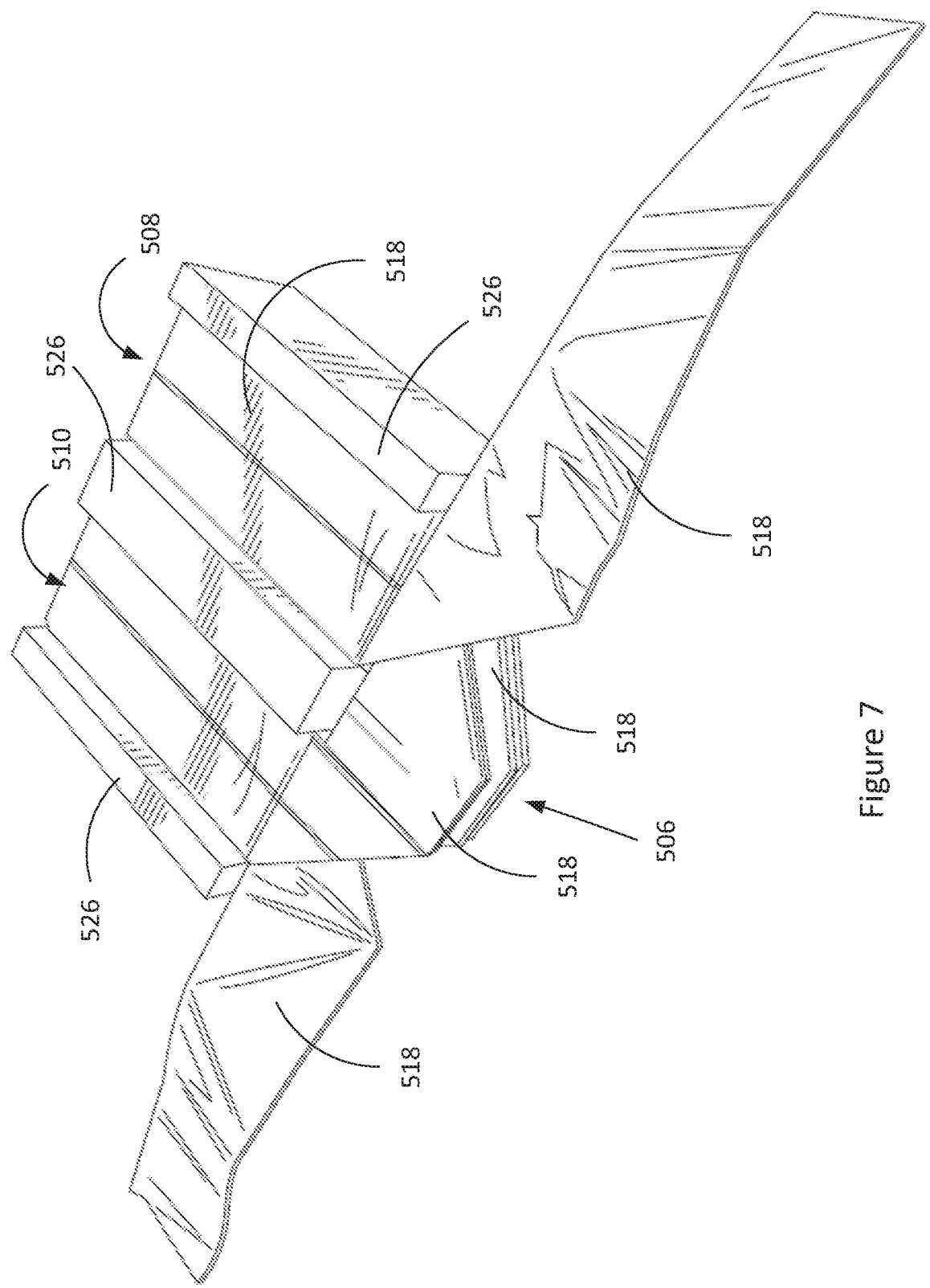
Figure 8:
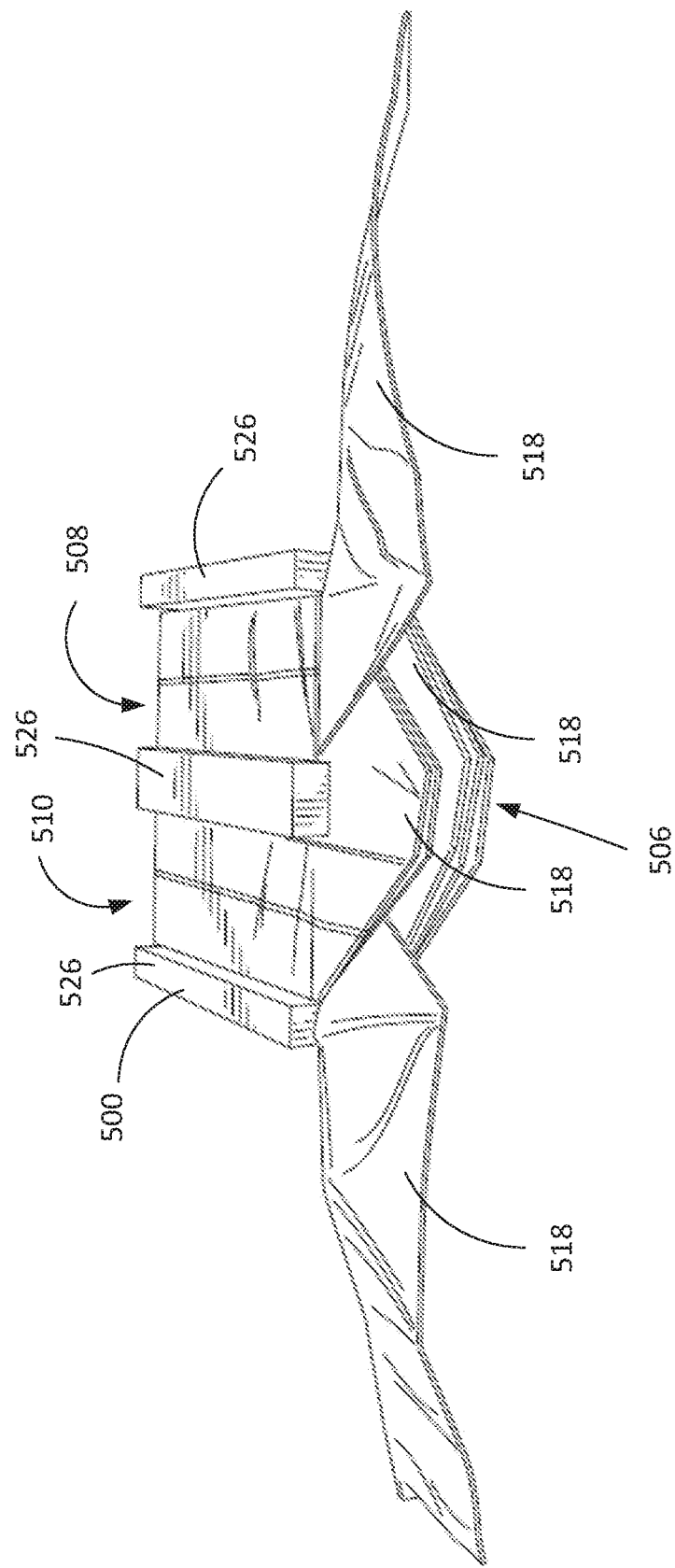

FIGS. 6-15 illustrate various stages of the plurality of transformers during the construction of the plurality of transformers of the power control module 74. FIG. 6 illustrates an example of the first continuous primary winding 518 being wound and forming a folded section 524 of the first continuous primary winding 518 between the plurality of ferrite cores 502, 504 of the stack 500. FIG. 7 illustrates the first continuous primary winding 518 after a number of turns 506 have been wound. FIG. 8 illustrates a different perspective view of the first continuous primary winding 518 being wound after the number of turns 506 have been wound.

Figure 9:
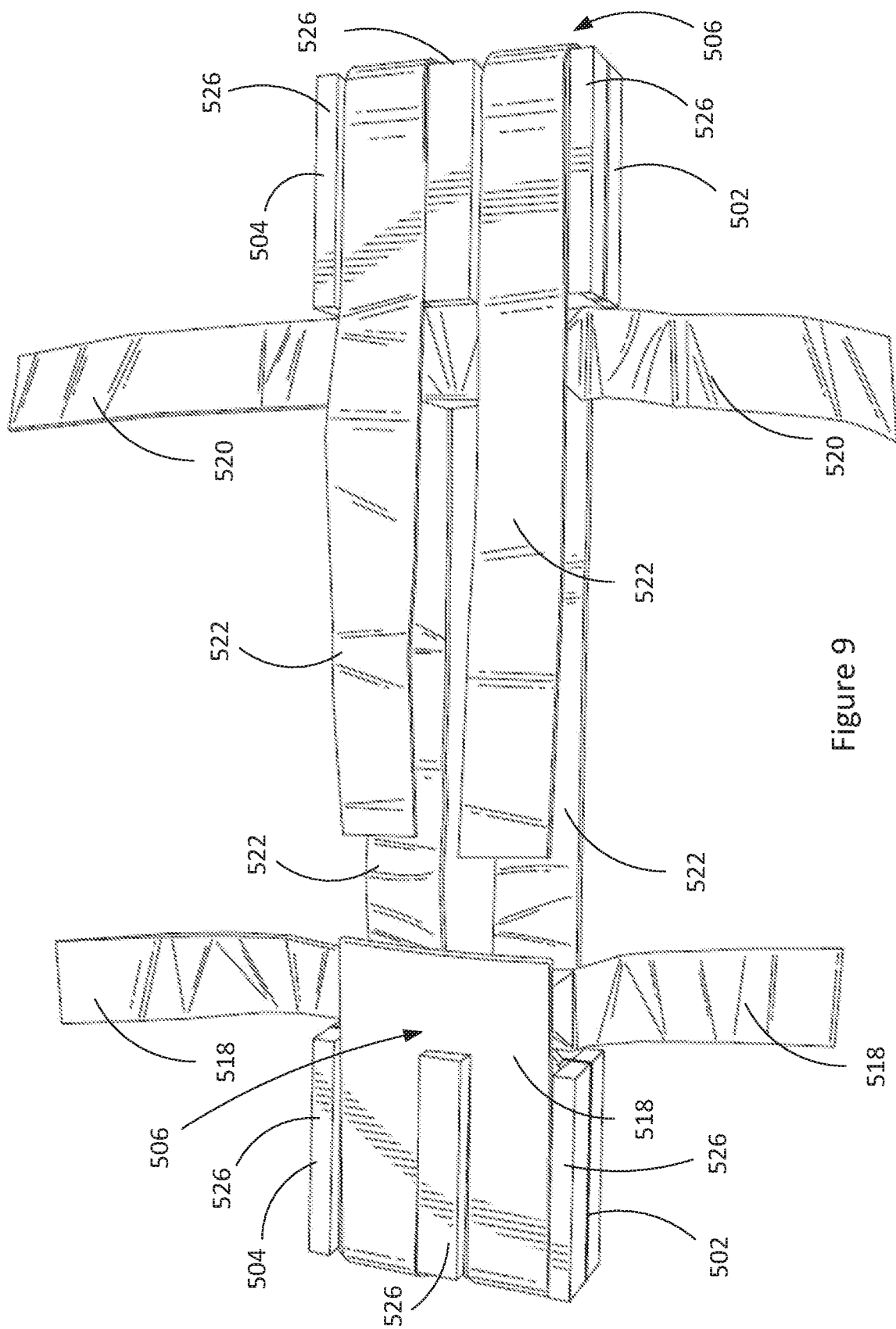
Figure 10:
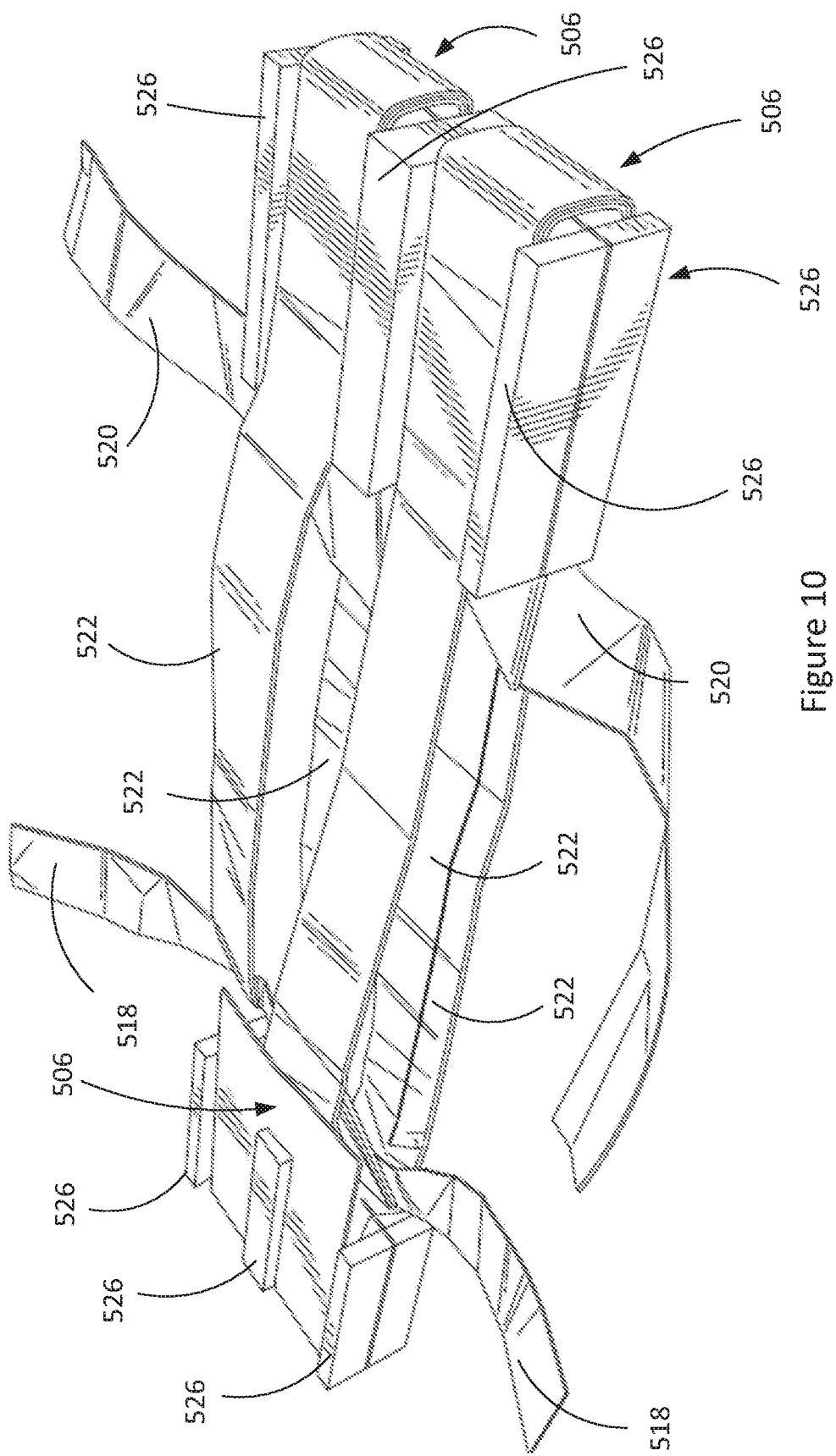

FIG. 9 illustrates a secondary winding 522 being wound between the plurality of transformers with the first primary winding 518 and the second primary winding 520 being wound. FIG. 10 illustrates a different perspective view of the secondary winding 522, the first primary winding 518, and the second primary winding 520 being wound.

Figure 11:
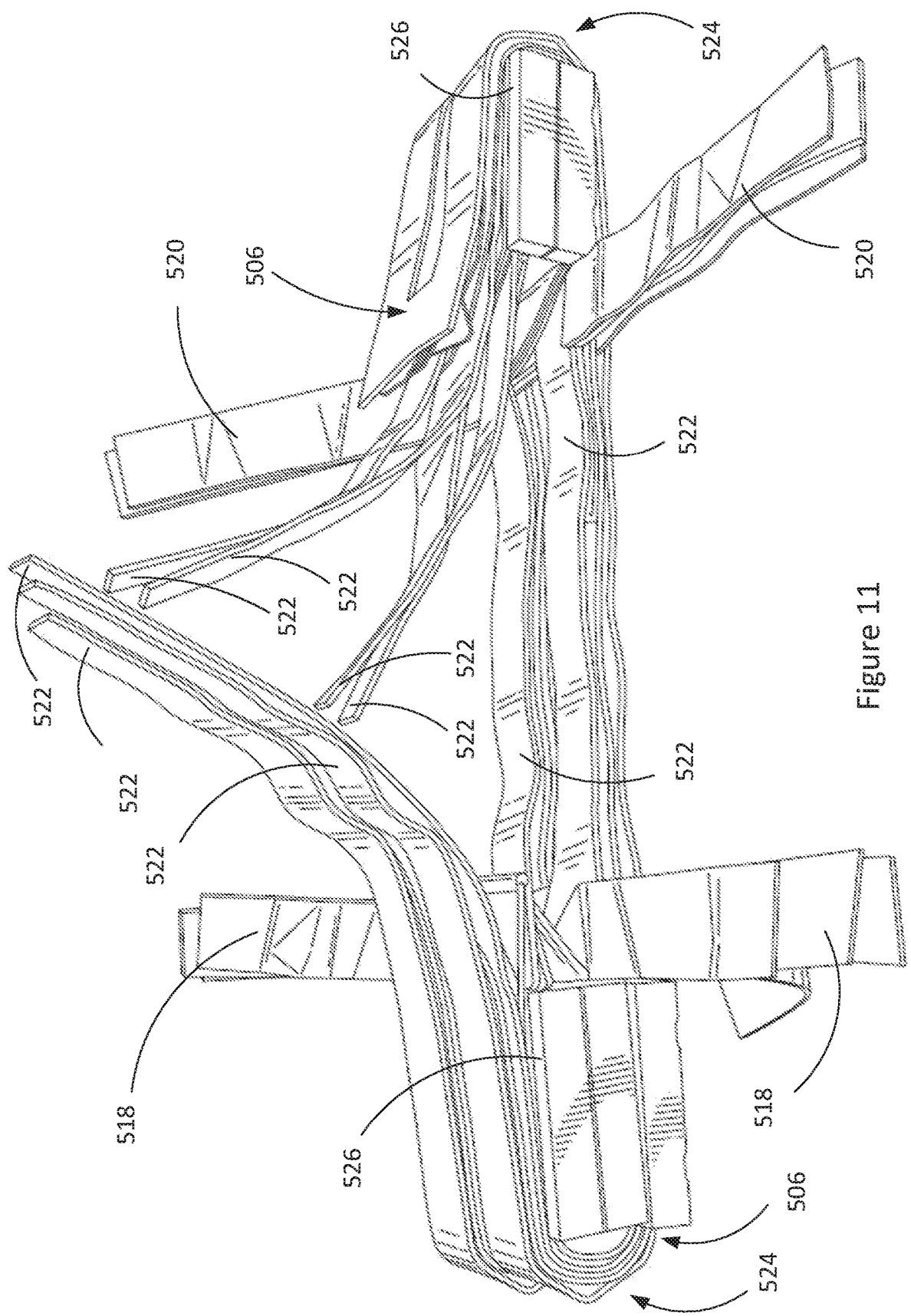
Figure 14:
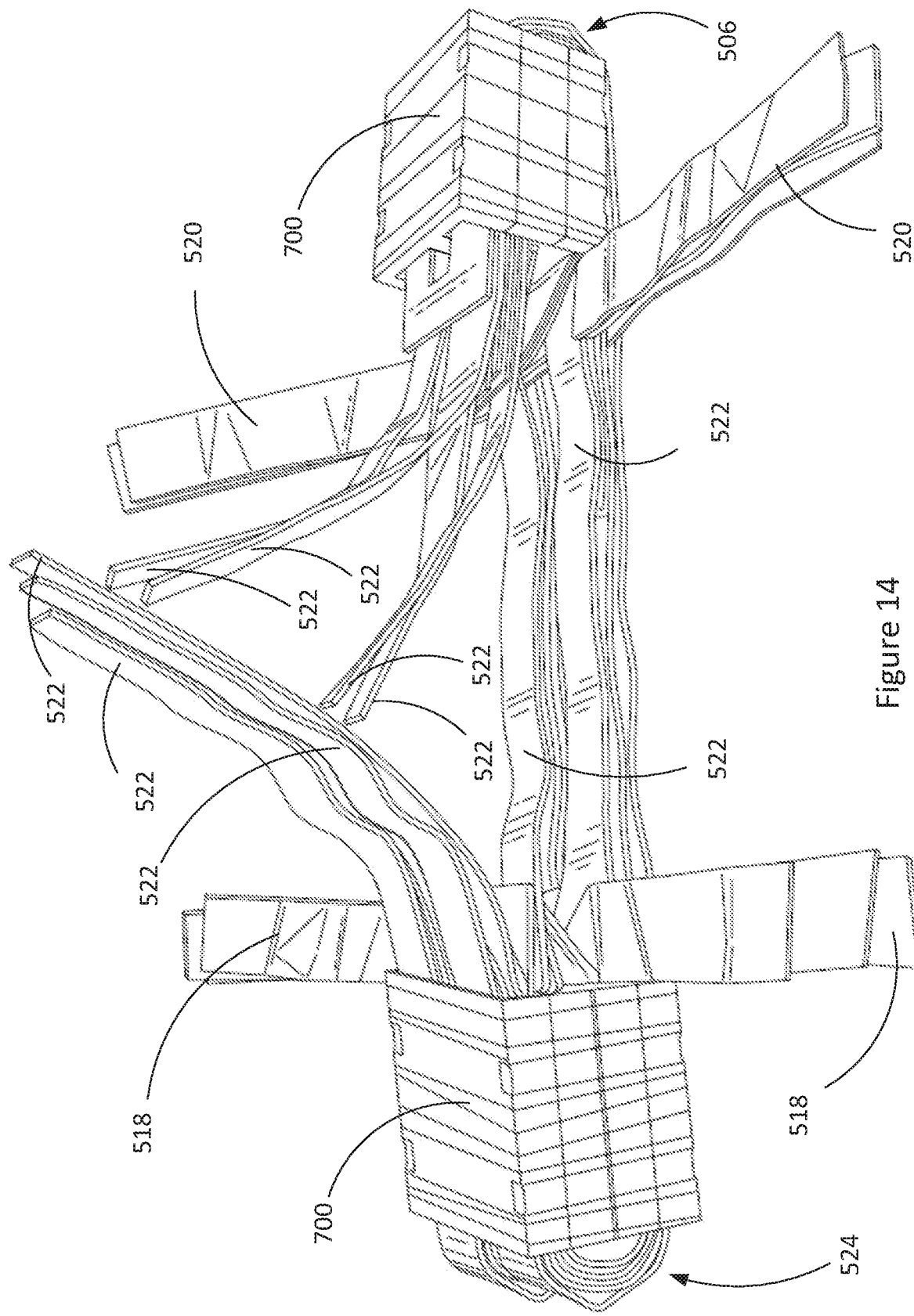
Figure 15:
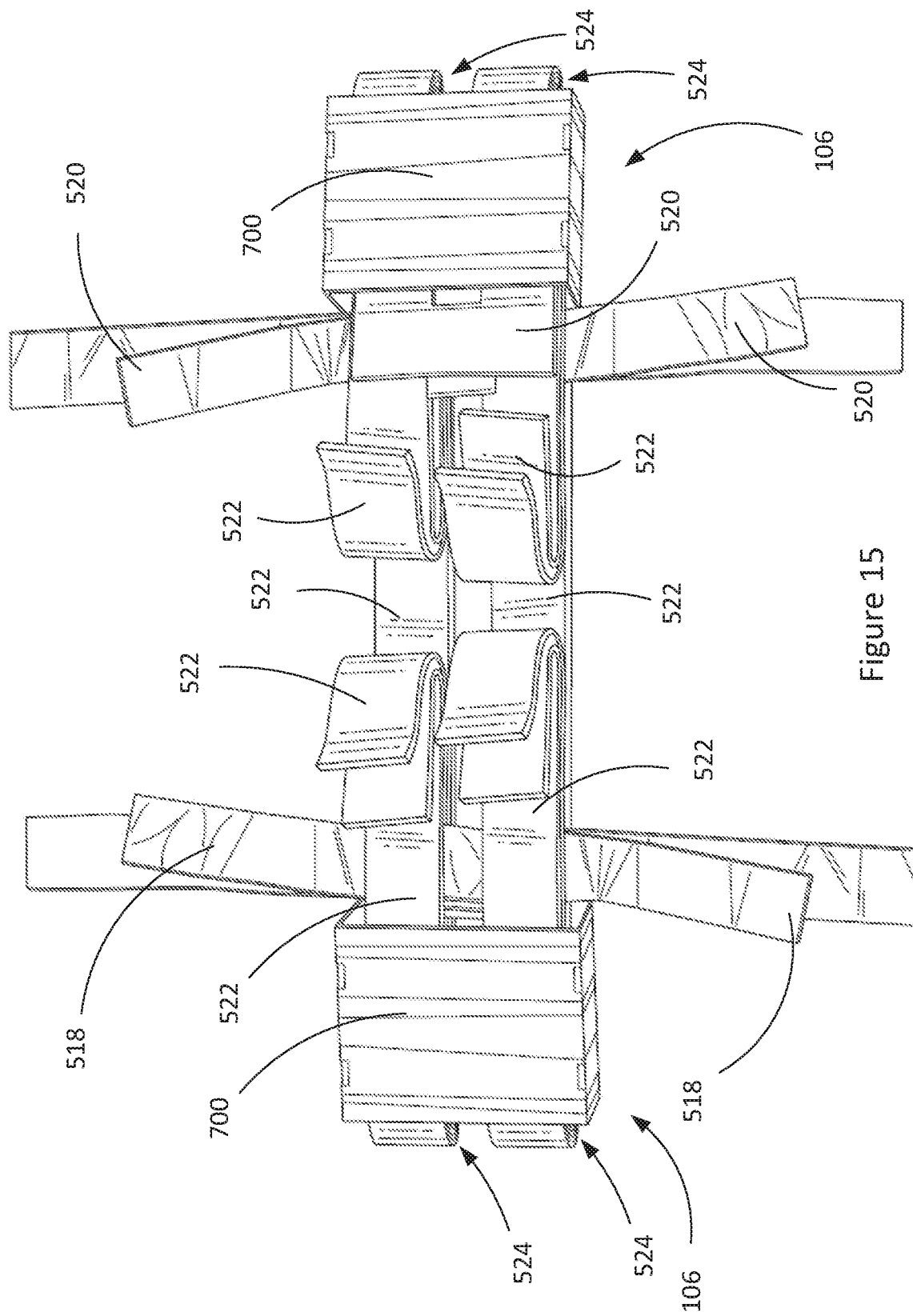

FIG. 11 illustrates the transformers prior to the stack 500 of ferrite cores being formed. FIG. 12 shows one of the transformers being complete with all ferrite cores 502, 504 stacked together and the other transformer being stacked. FIGS. 13 and 14 show a different perspective view of FIG. 12. FIG. 15 illustrates the secondary winding 522 being formed prior to connection to the output diodes 108.

FIG. 16 shows the transformers after potting material 802 has been applied and a mounting bracket 800 has been placed over the potting material 802.

During the construction, the length of the windings (i.e., the first continuous primary winding 518, the second continuous primary winding 520, and the secondary winding 522) may be selected to be long enough to be connected to the FETS 110, output diodes 108, or voltage source (e.g., one or more batteries). This allows the transformer windings to be connected to the FETs, output diodes, and voltage source and be set to the correct length for the connection.

The disclosed power control module and associated methods help to reduce weight and size compared to conventional power control modules. For instance, the plurality of ferrite cores being oriented such that the plurality of ferrite cores are stacked together with legs of the plurality of ferrite cores oriented in opposite directions, and the continuous winding and secondary winding having folded sections that extend between the plurality of ferrite cores of the stack of ferrite cores, help to reduce weight and size of the power control module compared to conventional power control modules.

In the above-description of various embodiments of the present disclosure, it is to be understood that the terminology used herein is for the purpose of describing particular embodiments only and is not intended to be limiting of the present disclosure. Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of the present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the present disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of the present disclosure. Accordingly, the above disclosed subject matter is to be considered illustrative, and not restrictive, and the examples of embodiments are intended to cover all such modifications, enhancements, and other embodiments, which fall within the spirit and scope of the present disclosure. Thus, to the maximum extent allowed by law, the scope of the present disclosure are to be determined by the broadest permissible interpretation of the present disclosure including the examples of embodiments and their equivalents, and shall not be restricted or limited by the foregoing detailed description.

We claim:

1. A method to create a power control module, the method comprising:
    winding a first continuous primary winding having a plurality of turns through each of a first ferrite core and a second ferrite core of a first stack of a plurality of stacks of ferrite cores;
    winding a second continuous primary winding having a plurality of turns through each of a first ferrite core and a second ferrite core of a second stack of the plurality of stacks of ferrite cores;
    winding a secondary winding with at least one turn through each ferrite core of the first stack of the plurality of stacks of ferrite cores and the second stack of the plurality of stacks of ferrite cores to connect the first stack of the plurality of stacks of ferrite cores to the second stack of the plurality of stacks of ferrite cores;
    forming a plurality of transformers connected to each other via the secondary winding at a distance apart from each other with each transformer of the plurality of transformers having a folded section that extends between the plurality of ferrite cores of the stack of ferrite cores by placing each stack of the plurality of stacks of ferrite cores on a surface with each of the first ferrite core and the second ferrite core of the stack placed on the surface at a distance between the first ferrite core and the second ferrite core, wherein each transformer of the plurality of transformers is formed by folding one of the first ferrite core and the second ferrite core onto the other of the first ferrite core and the second ferrite core to form the stack of the plurality of stacks of ferrite cores;
    connecting a plurality of output diodes to the secondary winding; and
    for each transformer of the plurality of transformers, connecting a set of field effect transistors, FETs, wherein FETs of the set of FETs are positioned on opposite sides of the stack, by interfacing leads of the first primary continuous winding or the second primary continuous winding with the FETs positioned on opposite sides of the stack, wherein the leads of the first continuous primary winding or the second continuous primary winding comprises two leads.

2. The method of claim 1, wherein for each stack of the plurality of stacks, each of the first ferrite core and the second ferrite core have a first slot and a second slot, and wherein winding the first continuous primary winding comprises winding the first continuous primary winding such that each of the plurality of turns of the first continuous primary winding is wound through the first slot of the first ferrite core and the second ferrite core of the first stack and back through the second slot of the first ferrite core and the second ferrite core of the first stack, and wherein winding the second continuous primary winding comprises winding the second continuous primary winding such that each of the plurality of turns of the second continuous primary winding is wound through the first slot of the first ferrite core of the first stack and the second ferrite core of the second stack and back through the second slot of the first ferrite core of the second stack and the second ferrite core of the first stack.

3. The method of claim 1 wherein winding the secondary winding comprises winding the secondary winding by winding a single turn through each first slot of the first stack across the distance and each first slot of the second stack and back through the second slot of the second stack, across the distance, and through each second slot of the first stack.

4. The method of claim 1 wherein forming the plurality of transformers connected to each other via the secondary winding comprises folding one of the first ferrite core and the second ferrite core on the other of the first ferrite core and the second ferrite core to form a stack of ferrite cores, with each stack oriented such that legs of the first ferrite core and the second ferrite core are stacked together and oriented in opposite directions and the secondary winding and the first continuous primary winding or the second continuous primary winding are folded along an axis.

5. The method of claim 1 further comprising placing the plurality of transformers in a multi-rotor unmanned aerial vehicle (UAV).

6. The method of claim 1 further comprising sizing the plurality of transformers to handle a first power draw for a first time period followed by a second power draw for a second time period.

7. The method of claim 6 wherein sizing the plurality of transformers comprises sizing the plurality of transformers to handle a first power draw of approximately sixty kilowatts, kWs, for a first time period of approximately thirty seconds and a second power draw of approximately one hundred twenty kWs for a second time period of approximately ten seconds.

8. The method of claim 1 wherein winding the first continuous primary winding comprises winding a first copper sheet and winding the second continuous primary winding comprises winding a second copper sheet, wherein each of the first copper sheet and the second copper sheet comprises a plurality of layers, each layer of the plurality of layers separated by a non-conductive material, and wherein winding the first continuous primary winding further comprises winding four turns of the first copper sheet and winding the second continuous primary winding further comprises winding four turns of the second copper sheet.

9. The method of claim 1, further comprising:
potting the plurality of transformers with thermal conductive potting to form a plurality of potted transformers.

* * * * *